(12) United States Patent
Ooyanagi

(10) Patent No.: US 9,396,418 B2
(45) Date of Patent: Jul. 19, 2016

(54) INFORMATION PROCESSING APPARATUS, INFORMATION PROCESSING METHOD, AND STORAGE MEDIUM FOR PROCESSING AN IMAGE AND A PATTERN INCLUDED IN AN XOR-AND-XOR RENDERING COMMAND SET

(71) Applicant: CANON KABUSHIKI KAISHA, Tokyo (JP)

(72) Inventor: Maho Ooyanagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/592,777

(22) Filed: Jan. 8, 2015

(65) Prior Publication Data

US 2015/0199595 A1 Jul. 16, 2015

(30) Foreign Application Priority Data

Jan. 14, 2014 (JP) .................................. 2014-004576

(51) Int. Cl.
G06K 15/02 (2006.01)
G06T 3/40 (2006.01)
H04N 1/393 (2006.01)
H04N 1/40 (2006.01)
H04N 1/405 (2006.01)

(52) U.S. Cl.
CPC ........ G06K 15/1872 (2013.01); G06K 15/1822 (2013.01); G06T 3/4015 (2013.01); H04N 1/3935 (2013.01); H04N 1/40075 (2013.01); H04N 1/405 (2013.01)

(58) Field of Classification Search
None
See application file for complete search history.

(56) References Cited

U.S. PATENT DOCUMENTS

| 4,803,558 | A | * | 2/1989 | Hiratsuka | .......... | H04N 1/40075 |
| | | | | | | 358/3.07 |
| 5,495,542 | A | * | 2/1996 | Shimomura | ............. | G06N 3/04 |
| | | | | | | 382/156 |
| 2007/0296736 | A1 | * | 12/2007 | Hunt | ......................... | G06T 5/30 |
| | | | | | | 345/629 |

FOREIGN PATENT DOCUMENTS

| EP | 0383398 A2 | 8/1990 |
| EP | 0505113 A2 | 9/1992 |
| JP | 2005-004319 A | 1/2005 |
| JP | 2013-153270 A | 8/2013 |

OTHER PUBLICATIONS

The extended European search report for European Application No. 15151004.7-1903, dated Jun. 11, 2015.

* cited by examiner

*Primary Examiner* — King Poon
*Assistant Examiner* — Andrew H Lam
(74) *Attorney, Agent, or Firm* — Canon USA, Inc. I.P. Division

(57) ABSTRACT

An information processing apparatus includes a receiving unit configured to receive a pattern indicating positions of non-transparent pixels of a semi-transparent object; a multi-valuing processing unit configured to perform multivaluing processing on the received pattern; a scaling processing unit configured to perform scaling processing on the multivalued pattern, and an applying unit configured to apply a screen to the scaled pattern.

12 Claims, 16 Drawing Sheets

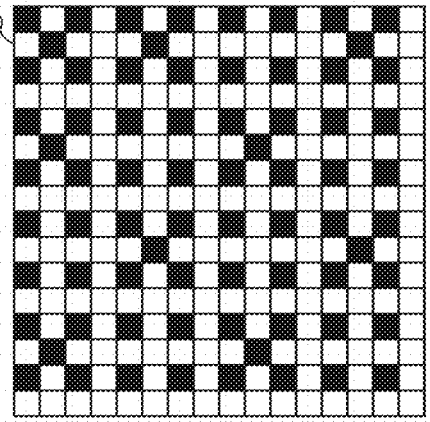
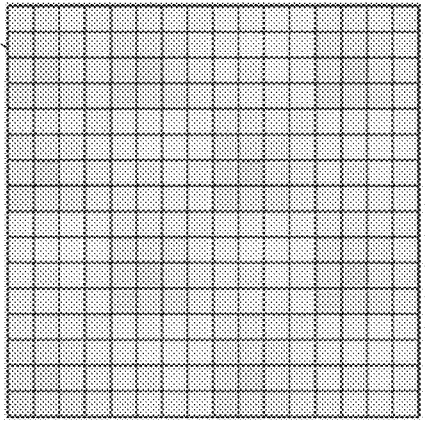
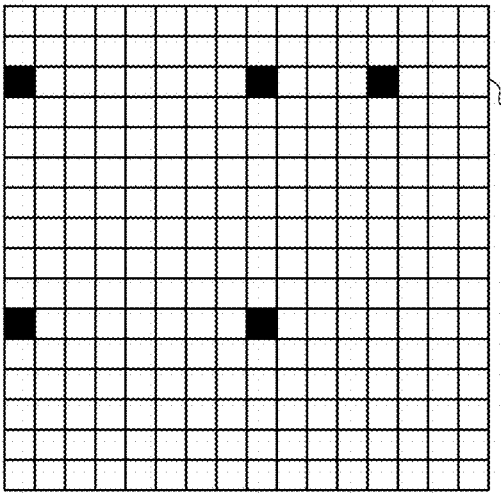
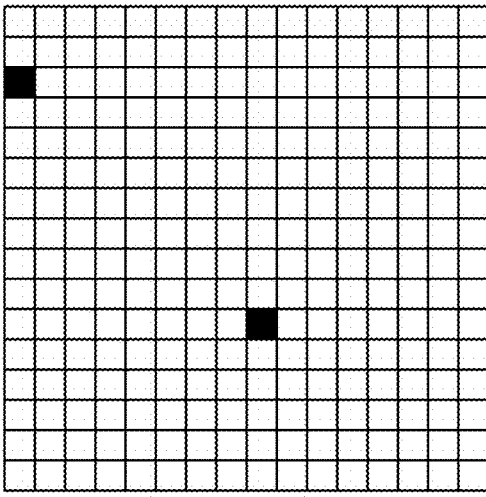
FIG. 13

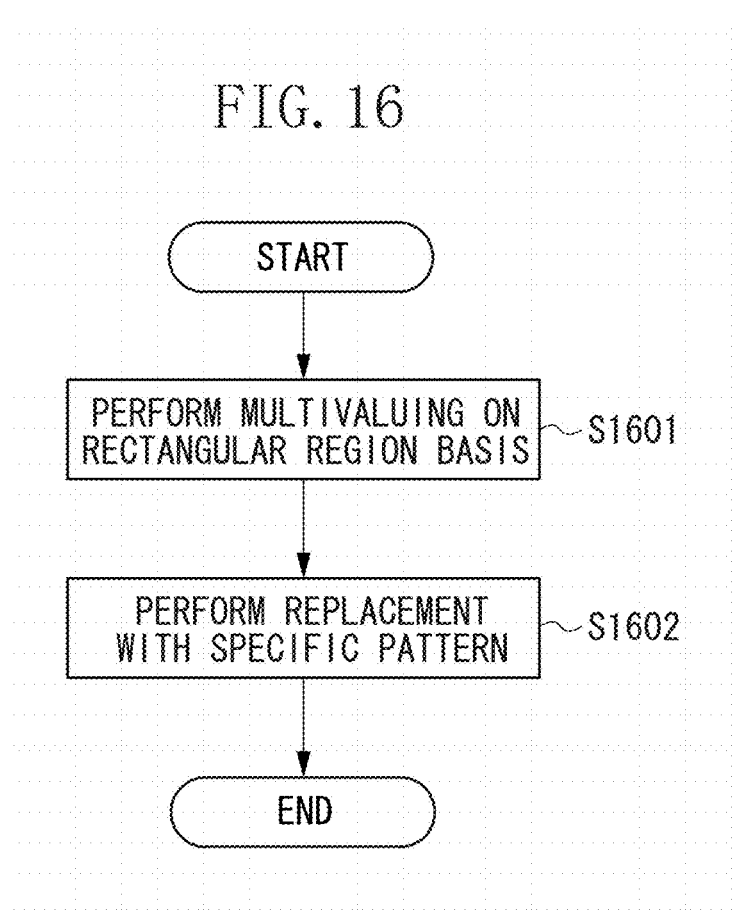

INFORMATION PROCESSING APPARATUS, INFORMATION PROCESSING METHOD, AND STORAGE MEDIUM FOR PROCESSING AN IMAGE AND A PATTERN INCLUDED IN AN XOR-AND-XOR RENDERING COMMAND SET

BACKGROUND OF THE INVENTION

1. Field of the Invention

The present invention relates to an information processing apparatus that prevents image deterioration due to scaling processing performed on a semi-transparent object, an information processing method, and storage medium.

2. Description of the Related Art

A semi-transparent object is an object whose transparency (which may be called "transmittance") is set at a value greater than 0% and less than 100%. This transparency can be set in various applications. For example, in PowerPoint (trademark) by Microsoft Corporation, the transparency can be set on a setting screen as illustrated in FIG. 1. This can be set in steps of 1%.

FIG. 2 illustrates four objects. An object 1 has transparency set at 0%. An object 2 has transparency set at 50%. An object 3 has transparency set at 75%. An object 4 has transparency set at 100%. Of these, the object 2 and the object 3 are semi-transparent objects, the object 1 is a normal (e.g., solid) object, and the object 4 is a completely transparent object.

FIG. 3 is a diagram illustrating the significance of an existence of a semi-transparent object. In FIG. 3, a bar object in dark gray color is disposed behind the objects 1 to 4. Usually, when a certain object is disposed behind another object, the certain object cannot be seen. However, in FIG. 3, since the object 2 and the object 3 are the semi-transparent objects, not only the object 2 and the object 3 but also a part of the bar object disposed behind these objects can be seen. In this way, a semi-transparent object has an effect of allowing a part of an object, that is behind the semi-transparent object, to be seen.

FIG. 4 is a diagram illustrating enlarged views 401 to 404 of the respective objects 1 to 4. In view 401, all pixels forming the object 1 are ON pixels, and the ON pixels each have a density of 32. In view 402, a half of all pixels forming the object 2 are ON pixels, and the remaining half are OFF pixels. An ON pixel means a pixel having a density (e.g., a non-transparent pixel), and an OFF pixel means a pixel not having a density (e.g., a transparent pixel). A pixel having a density of 0 is also an ON pixel, but such a pixel is called a white pixel, and not a transparent pixel. Accordingly, a semi-transparent object is an object expressing semi-transparency by a combination of ON pixels and OFF pixels.

In view 403, 25% of all pixels forming the object 3 are ON pixels, and the remaining 75% are OFF pixels. In view 404, all pixels forming the object 4 are OFF pixels. In the present specification, a description will be given using mainly density as an example. However, "density" and "luminance" have substantially the same meaning, and thus these terms are interchangeable. In other words, the term "density" is assumed to include the term "luminance".

Now, a semi-transparent object rendering method will be described.

Semi-transparent object rendering processing is implemented using a combination of raster operation (ROP) processing. For example, a method of rendering a semi-transparent object by the combination of an XOR operation, an AND operation, and an XOR operation, will be described with reference to FIG. 6.

As illustrated in FIG. 6, rendering a semi-transparent object on a background requires: (1) overwriting processing, (2) XOR processing, (3) AND processing, and (4) XOR processing. In the following description, the phrase "rendering region" is used. This should be taken to mean a region to be rendered, or in other words a region where an image(s) is (are) to be rendered.

First, in the (1) overwriting processing, a rendering region 601 is overwritten with a background 602. This background 602 is, for example, equivalent to the bar object in dark gray illustrated in FIG. 3. For example, when the rendering region 601 of K=0 is overwritten with the background 602 of K=218, an image 606 is obtained.

Next, in the (2) XOR processing, an image 603 where all pixels are ON pixels is rendered on the image 606, using the XOR operation. The density of each of the ON pixels is equal to the density of the ON pixels in the semi-transparent object, in this example "32". For example, the XOR operation is performed between the image 603 where all the pixels have the density of K=32 and the background 602 of K=218. In other words, the XOR operation is performed between K=218 ("11011010") and K=("00100000"). As a result, the K density of all the pixels becomes 250 ("11111010"). An image 607 illustrates this result.

Next, in the (3) AND processing, a semi-transparent pattern 604 is rendered on the image 607 by using the AND operation. The semi-transparent pattern 604 indicates which pixel in the semi-transparent object is an ON pixel, and which pixel is an OFF pixel. For example, where the semi-transparent pattern 604 has a transparency of 50%, ON pixels (K=255) and OFF pixels (K=0) are alternately arranged. Therefore, the AND operation is performed between K=255 ("11111111") and the image 607 resulting from the (2) XOR processing. Further, the AND operation is performed between K=0 ("00000000") and the image 607 resulting from the (2) XOR processing. As a result, the pixel of K=255 in the semi-transparent pattern 604 becomes K=250 ("11111010"), and the pixel of K=0 remains as K=0 ("00000000"), as illustrated in an image 608.

Finally, in the (4) XOR processing, the XOR operation is performed between the image 608 resulting from the (3) AND processing and an image 605 identical with the image 603. In other words, the XOR operation is performed between K=250 ("11111010") and K=32 ("00100000"). Further, the XOR operation is performed between K=0 ("00000000") and K=32 ("00100000"). As a result, pixels of K=32 and pixels of K=218 are alternately arranged, as illustrated in an image 609. The semi-transparent object can be thus rendered on the background 602.

The semi-transparent object described above is discussed, for example, in Japanese Patent Application Laid-Open No. 2005-4319.

When this semi-transparent object is scaled, the semi-transparent pattern typically become distorted, which considerably degrades the image quality. This issue will be described below with reference to, for example, an issue arising when using (1) the nearest neighbor method as a reduction method, and an issue arising when using (2) the black pixels saving method as a reduction method.

FIG. 7 illustrates image deterioration when using the (1) nearest neighbor and (2) black pixels saving methods.

When the nearest neighbor method (1) is used, pixels are thinned out according to a reduction ratio, which may distort the semi-transparent pattern. For example, a semi-transparent pattern having transparency of 50% is shown as pattern 701 in which ON pixels and OFF pixels are alternately arranged. When this pattern 701 is reduced by one-half, the reduction is performed by removing pixels except pixels indicated by "*", and the resulting pattern only contains pixels indicated by "*". Therefore, as can be seen a completely white image like image 702 is obtained.

When the black pixels saving method (2) is used, a semi-transparent pattern may be distorted as well. When this reduction processing, by which any ON pixels are left remaining, is performed on the semi-transparent pattern 701, if there is only one ON pixel in a 2×2 pixel region 701(*a*), all the pixels in this region 701(*a*) are replaced with ON pixels. Therefore, an image 703 may be obtained (although this may be an extreme example).

In either of the (1) nearest neighbor and (2) black pixels saving methods, or even in a case of using any other reduction method, considerable deterioration of a semi-transparent pattern due to the reduction cannot be suppressed.

SUMMARY OF THE INVENTION

According to a first aspect of the present invention, an information processing apparatus includes a receiving unit configured to receive a pattern indicating positions of non-transparent pixels of a semi-transparent object, a multivaluing processing unit configured to perform multivaluing processing on the received pattern, a scaling processing unit configured to perform scaling processing on the multivalued pattern, and an applying unit configured to apply a screen to the scaled pattern.

Further features of the present invention will become apparent from the following description of embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 13 is a diagram illustrating processing performed in step S904 of FIG. 9.

FIG. 16 is a flowchart illustrating processing according to the third embodiment of the present invention.

DESCRIPTION OF THE EMBODIMENTS

Figure 8:
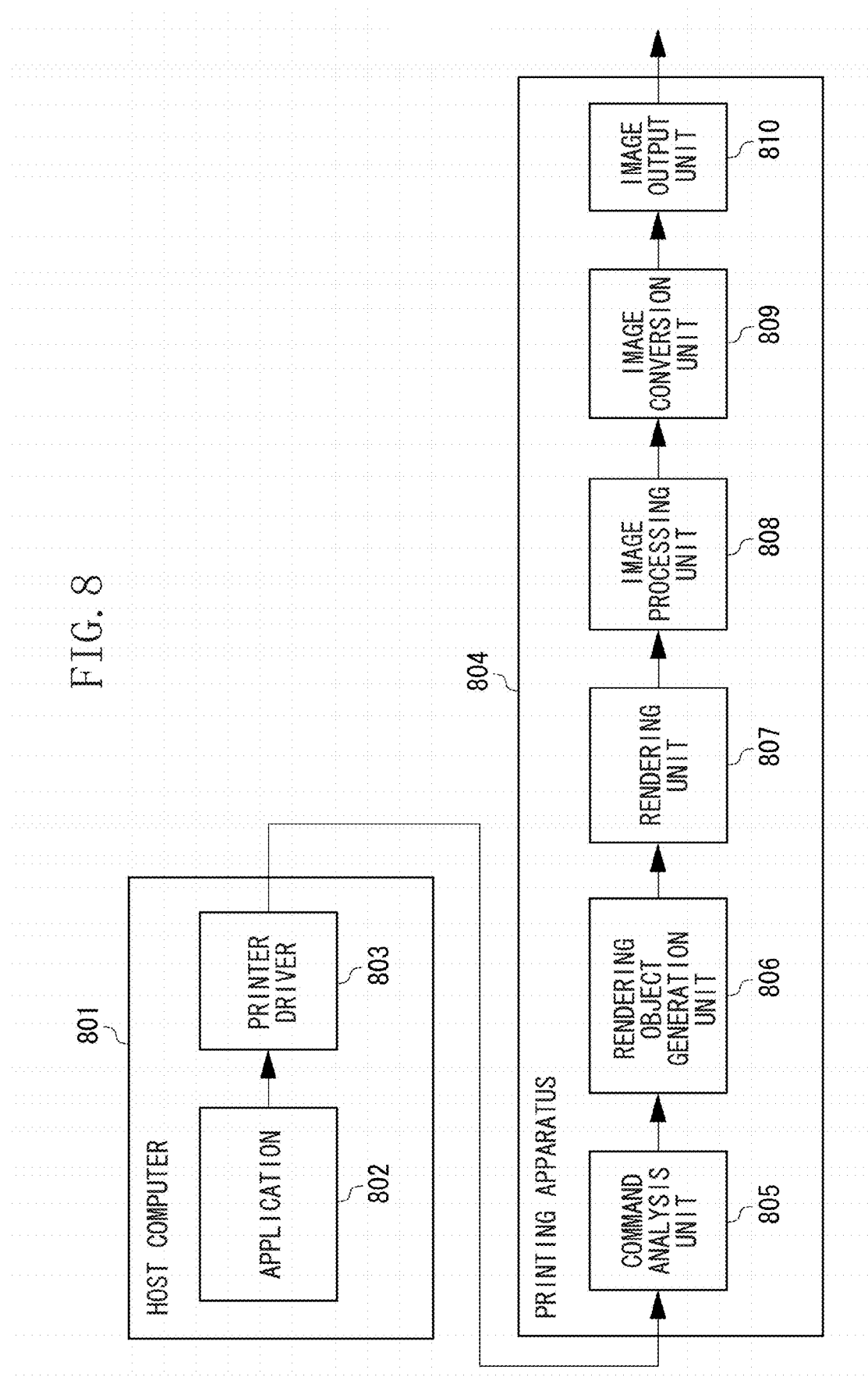
FIG. 8 is a system configuration diagram.

Hereinafter, embodiments will be described in detail with reference to the accompanying drawings. FIG. 8 is a system configuration diagram that is applicable to all embodiments.

A host computer 801 includes, although not shown, a central processing unit (CPU), a random access memory (RAM), and a read only memory (ROM). The ROM stores an application (program) 802 and a printer driver (program) 803. The application 802 creates document data. The printer driver 803 generates a print command from the created document data, and transmits the generated print command to a printing apparatus 804. This configuration enables the host computer 801 to execute the processing steps S901 to S905 shown in FIG. 9 (described later). The CPU loads the application and printer driver programs into the RAM and executes the loaded programs as appropriate, to perform this processing.

Further, the printing apparatus 804 includes a command analysis unit 805 that analyzes the print command generated by the printer driver 803, and a rendering object generation unit 806 that generates a rendering object from the analyzed print command. The printing apparatus 804 further includes a rendering unit 807 that generates a bitmap from the generated rendering object, and an image processing unit 808 that adjusts the generated bitmap to a printing image (for example, performs conversion from RGB to K). In this context a "printing image" means an image suitable for printing, or in other words an image in a form appropriate for printing. The printing apparatus 804 further includes an image conversion unit 809 and an image output unit 810. The image conversion unit 809 adjusts the printing image (for example, performs gamma correction and halftone processing) according to characteristics of the image output unit 810. The image output unit 810 outputs the image on a sheet or other suitable recording medium (e.g. the output unit is any form of printer and prints the image on, for example, a sheet of paper).

Embodiments will be described below assuming the printing apparatus 804 to be a monochrome printer. However, the printing apparatus 804 may be a color printer and the processes described in the embodiments below apply equally to such a color printer.

A first embodiment of the present invention will now be described.

Figure 9:
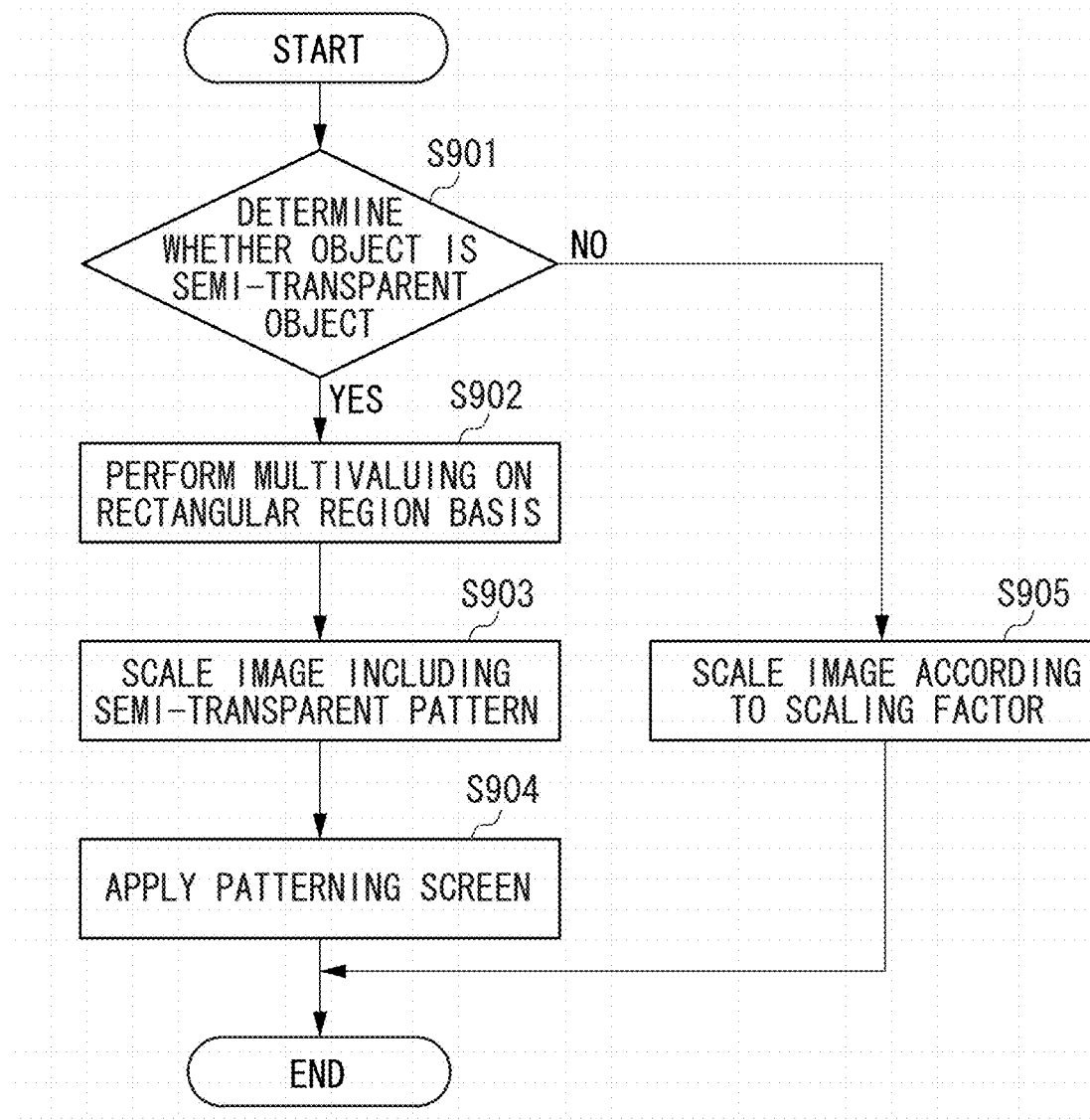
FIG. 9 is a main flowchart of the first embodiment.

FIG. 9 illustrates a flow of processing that the printer driver 803 performs after receiving document data including objects such as a semi-transparent object 1002 from the application 802. This processing will be described by also referring to FIG. 10.

In step S901, the printer driver 803 checks each object included in the document data received from the application 802. More specifically, the printer driver 803 determines whether each of the objects is a semi-transparent object. To be more specific, the printer driver 803 determines whether rendering commands for each of the objects received from the application 802 includes an XOR-AND-XOR rendering command set. When this rendering command set is included, the printer driver 803 determines that the object is a semi-transparent object. When this rendering command set is not included, the printer driver 803 determines that the object is not a semi-transparent object.

Further, the printer driver 803 may confirm that the image 603 to be rendered by the first XOR rendering command in the XOR-AND-XOR set, and the image 605 to be rendered by the last XOR rendering command are the same. Therefore, the printer driver 803 may determine that the object is a semi-transparent object (that is a semi-transparent object is detected), only when it is confirmed that the images 603 and 605 are the same. When the object is a semi-transparent object (YES in step S901), the printer driver 803 performs the processing in steps S902 to S904. When the object is not a semi-transparent object (NO in step S901), the processing proceeds to step S905. In step S905, the printer driver 803 scales the object according to a scaling ratio (such as any conventional scaling ratio technique).

Figure 10:
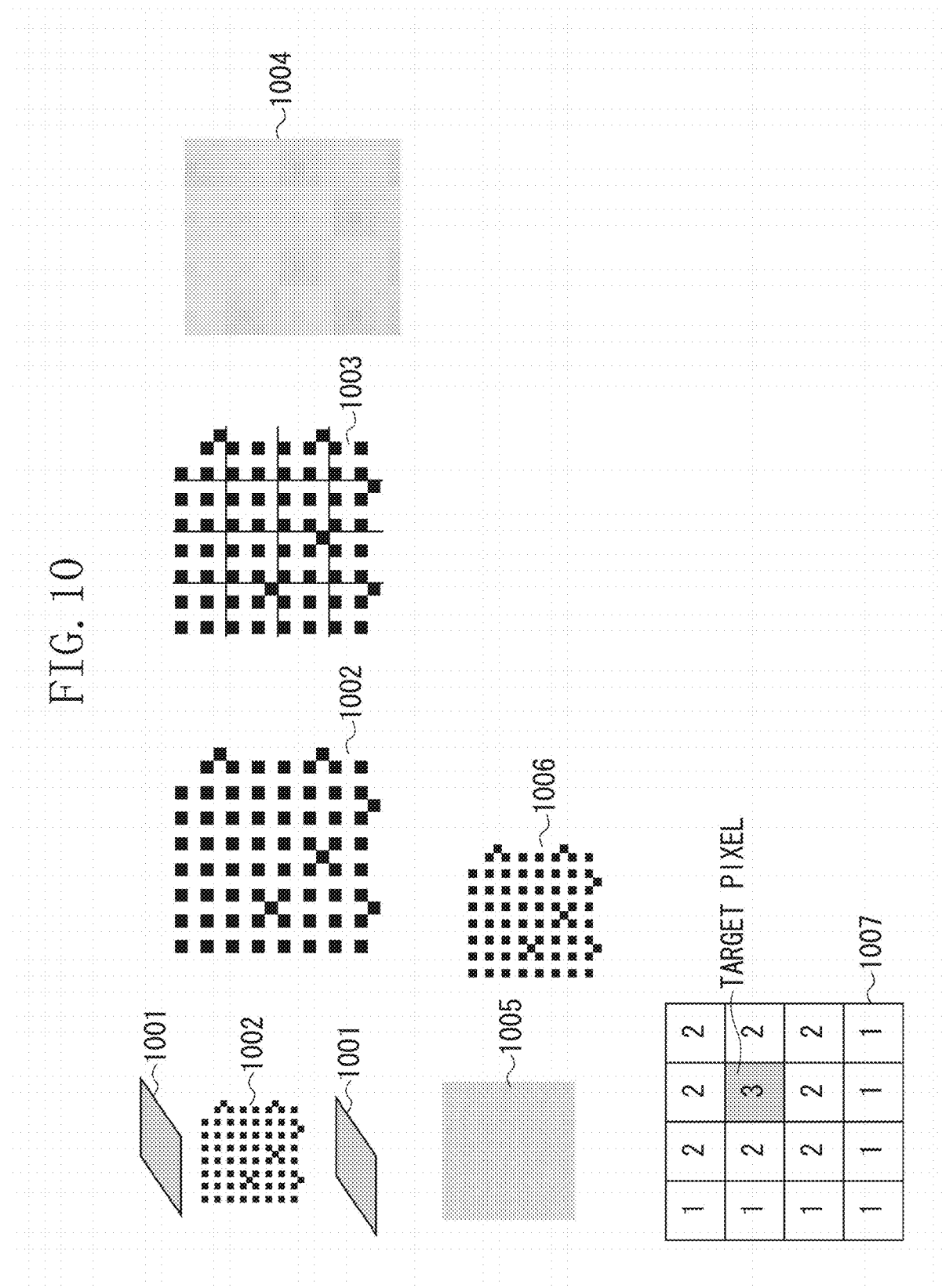
FIG. 10 is a diagram conceptually illustrating processing in the main flowchart.

In step S902, the printer driver 803 performs multivaluing processing on the semi-transparent pattern 604, the result of which is the semi-transparent pattern 1004 (see FIG. 10). This multivaluing processing will be described in detail below.

Figure 6:
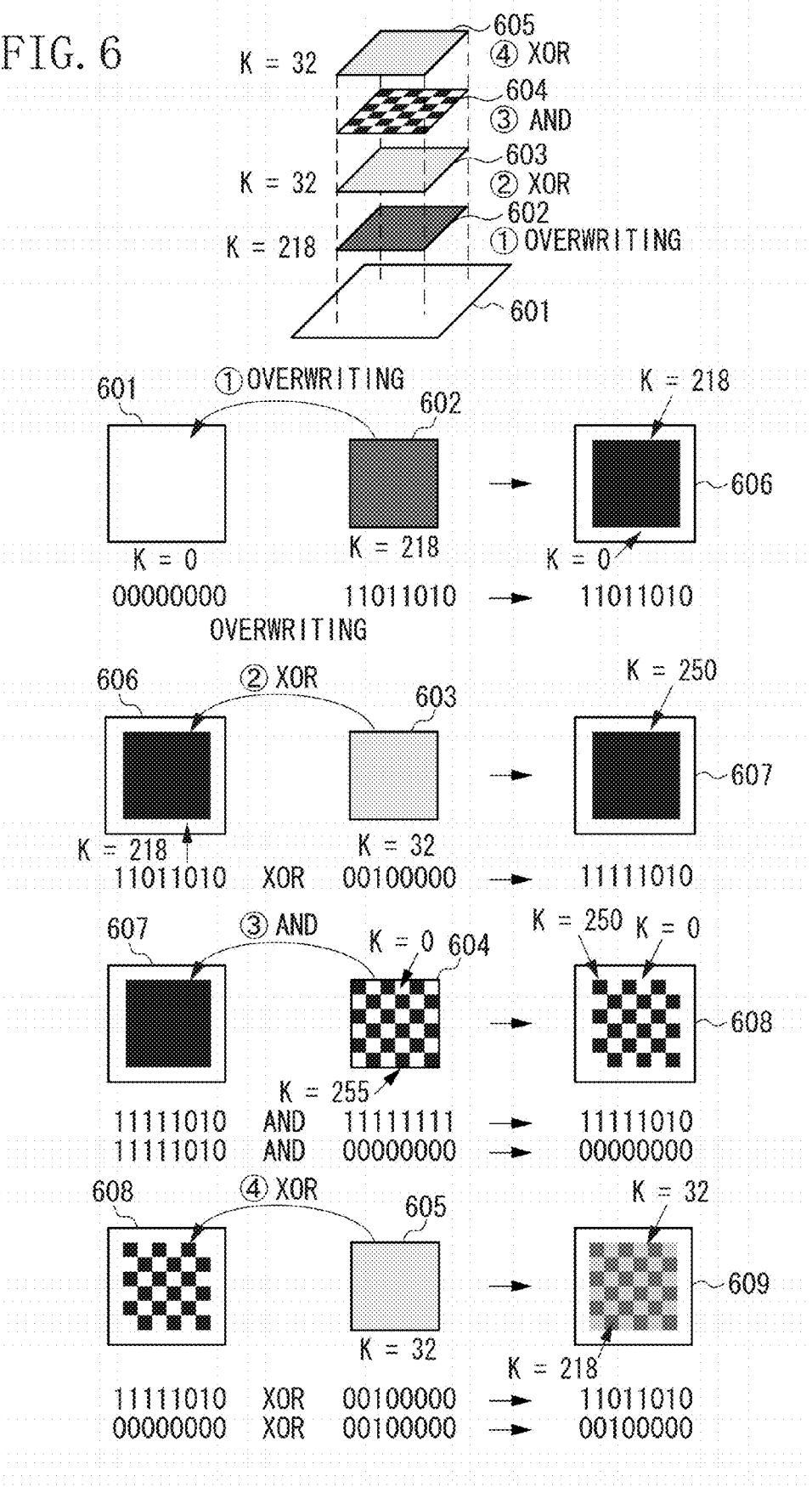
FIG. 6 is a diagram illustrating how a semi-transparent object is rendered.
Figure 7:
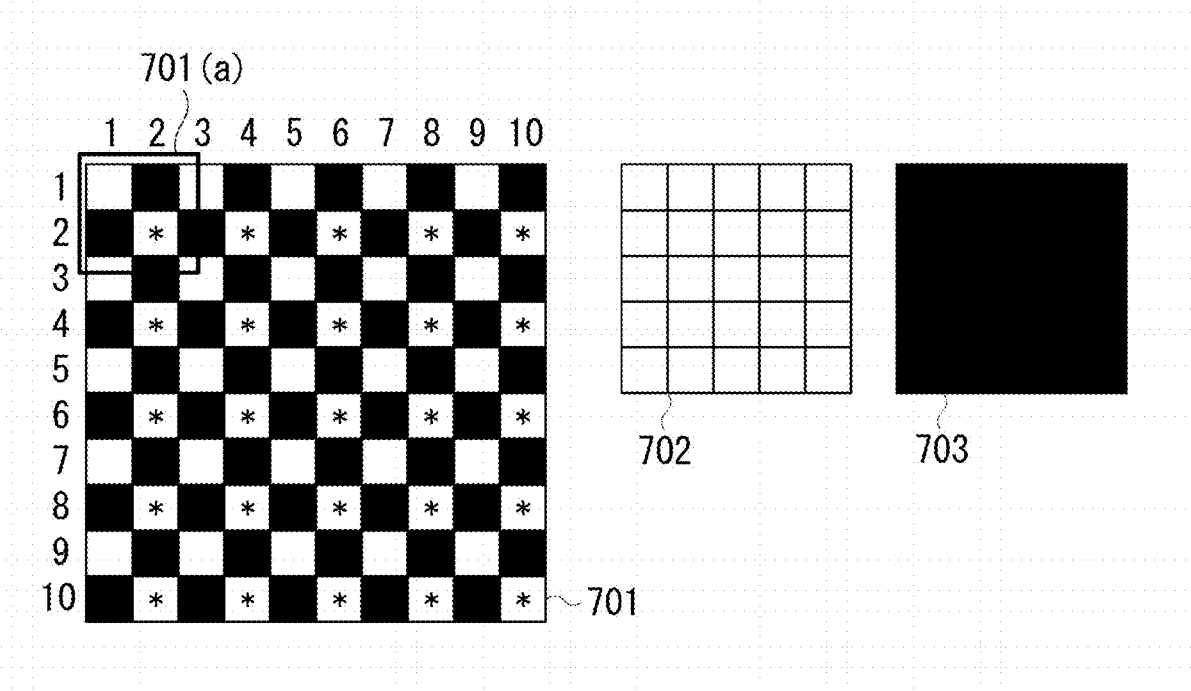
FIG. 7 is a diagram illustrating occurrence of image deterioration when a conventional technique is used.

In step S903, the printer driver 803 performs scaling processing on the multivalued semi-transparent pattern 1004, which is the result of the multivaluing processing in step S902, and two images 1001 (corresponding to the images 603 and 605 in FIG. 6) to be rendered by the XOR rendering commands. In the images 1001, all pixels are ON pixels. A scaled semi-transparent pattern 1005 is obtained by this scaling processing. This scaling processing may be a conventional technique. For example, thinning processing is performed in scaling down, and interpolation such as a bilinear method is performed in scaling up.

In step S904, the printer driver 803 applies a patterning screen to the scaled semi-transparent pattern 1005 in rectangular units of 16×16 pixels, and this results in pattern 1006. This processing will also be described in detail below. The printer driver 803 then converts the result (e.g. pattern 1006) of the application of the screen to the scaled semi-transparent pattern 1005 and the two images resulting from the scaling processing into a XOR-AND-XOR rendering command. The processing in step S904 may be considered to be a dithering process.

Next, the printer driver 803 converts the obtained XOR-AND-XOR rendering command into a form of a print command (a page-description language (PDL)), and transmits the print command to the printing apparatus 804. As described above, the command analysis unit 805 analyzes the print command received by the printing apparatus 804. The rendering object generation unit 806 converts the analyzed print command into a rendering object. The rendering unit 807 converts the rendering object into a bitmap image (for example, generates the bitmap image by performing XOR, AND, and XOR operations). In this conversion, an object located in front is superimposed on an object located behind this object. For example, when a semi-transparent object is located in front, and a normal (e.g. solid) object is located behind the semi-transparent object at the same position, the semi-transparent object is disposed on the normal object. As a result, the normal object can be seen only in part. This is because the semi-transparent object includes transparent pixels.

Further, the image processing unit 808 of the printing apparatus 804 performs processing such as gamma correction on the bitmap image. Subsequently, the image conversion unit 809 halftones the image received from the image processing unit 808 (for example, the image conversion unit 809 applies dithering processing to the image). The image output unit 810 then outputs (e.g. prints) the halftoned image on a sheet, or any other suitable recording medium.

Here, the dithering processing applied in the halftoning by the image conversion unit 809 is different from the dithering processing applied in step S904. They both employ dithering matrices, but use different coefficients. A screen of the former (used in the image conversion unit 809) is designed to enable expression of a multivalued image on a sheet by a binary printer, and has a known coefficient array such as a Bayer type. On the other hand, a patterning screen of the latter (used in the multivaluing process in step 904) is designed to generate a semi-transparent pattern, and has a coefficient array as will be described below.

In the present specification, the host computer 801, in which the printer driver 803 is installed, and the printing apparatus 804 are described as separate apparatuses, but may be integrated into a single apparatus. The host computer 801, the printing apparatus 804, and the integrated apparatus are all capable of performing information processing, and thus each can be said to serve as an information processing apparatus.

Next, details of the multivaluing processing performed in step S902, and details of the patterning screen application processing performed in S904 will be described. In the processing performed in S904, a patterning screen is applied to the scaled semi-transparent pattern 1005 (see FIG. 10).

<Details of Multivaluing Processing in Step S902>

The processing in step S902 for multivaluing a semi-transparent pattern, which is a binary image, will be described with reference to FIG. 10, FIG. 11 and FIG. 12.

In the present embodiment, it is desired to perform the multivaluing while leaving a shape expressed in a semi-transparent pattern to some extent (a shape in which black pixels and white pixels are in a staggered arrangement). For example, such a shape may be a word such as "CLEAR" expressed by black pixels and white pixels arranged in a particular arrangement. Therefore, the printer driver 803 obtains a weighted average, not a simple average, by using a weighted-average filter 1007 illustrated in FIG. 10. The printer driver 803 applies this filter 1007 to a semi-transparent pattern 1002, while sequentially selecting pixels one by one as a target pixel. As a result, the printer driver 803 obtains the multivalued semi-transparent pattern 1004.

However, the multivaluing processing in step S902 is not limited to the above method. For example, as illustrated in FIG. 12, an alternative multivaluing method capable of achieving a higher processing speed may be used. This method will be described below.

In step S1201, the printer driver 803 divides the semi-transparent pattern 1002 into groups each formed of 4×4 pixels. This division results in a pattern 1003. A part of this pattern 1003 is enlarged and illustrated as a pattern 1101 in FIG. 11.

In step S1202, the printer driver 803 expresses a group of 4×4 pixels (the pattern 1101) in 16 bits. For example as shown in FIG. 11, in a case of a semi-transparent pattern of 4×4 pixels like the pattern 1101, the printer driver 803 expresses an ON pixel (non-transparent pixel) as "1", and an OFF pixel (transparent pixel) as "0". Therefore, of the pattern 1101, a first row can be expressed as "1010", a second row as "0101", a third row as "1010", and a fourth row as "0100". When these rows are arranged in a line and expressed in 16 bits, the result is "1010010110100100"="0xA5A4" when expressed in hexadecimal.

In step S1203, the printer driver 803 performs multivaluing processing on the group of 4×4 pixels expressed in 16 bits (from step S1202), by using a table that will be described below. How this table is designed will also be described below.

Figure 11:
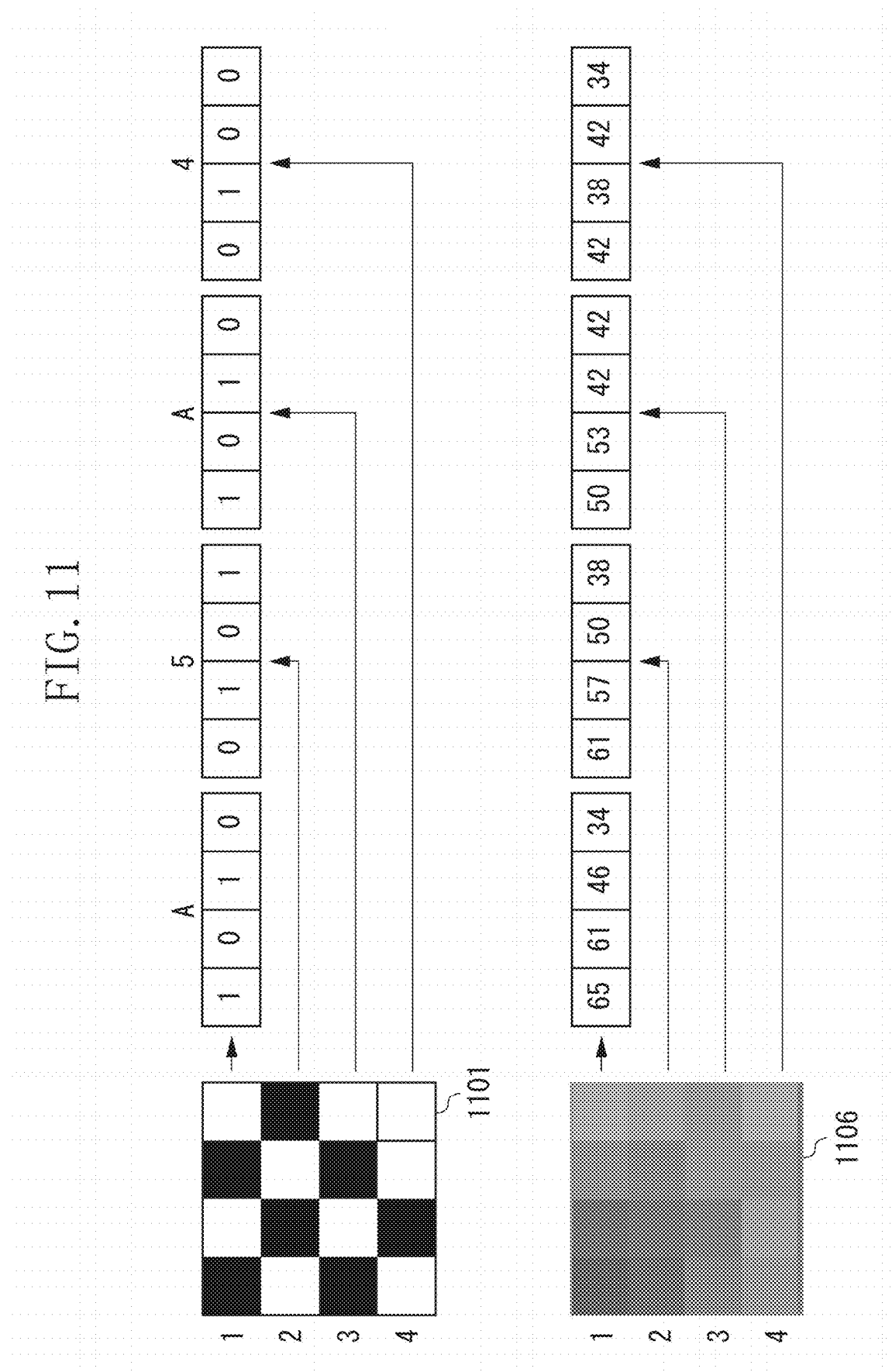
FIG. 11 is a diagram conceptually illustrating processing performed in step S902 of FIG. 9.
Figure 12:
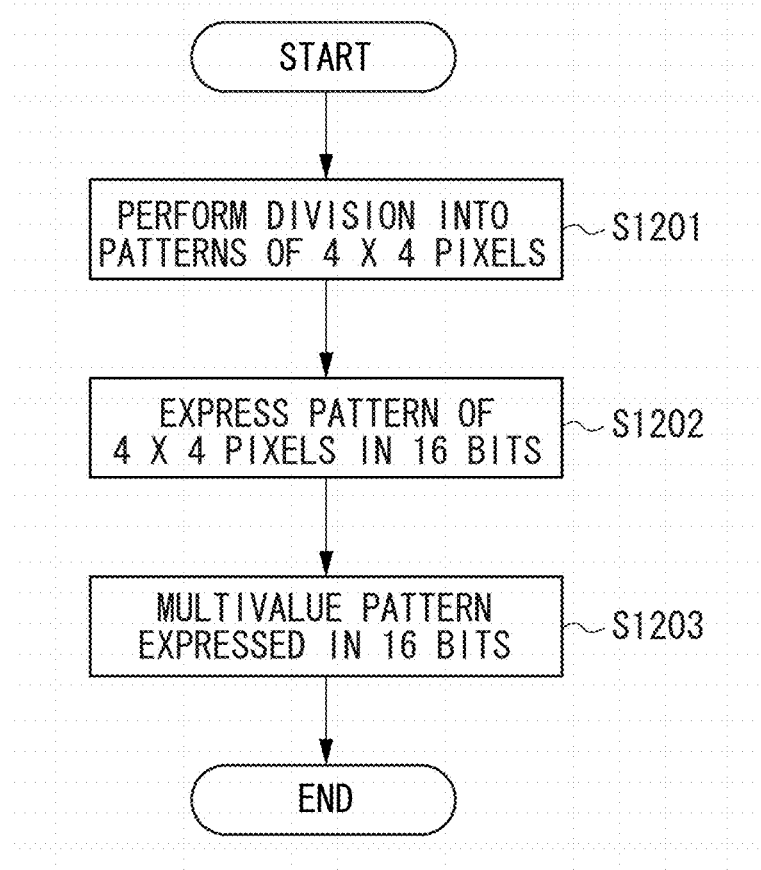
FIG. 12 is a flowchart illustrating the processing performed in step S902 of FIG. 9.

When the above-described weighted-average filter 1007 is applied to the 4×4 pixels expressed as "0xA5A4" (16 bits), a pattern 1106 illustrated in FIG. 11 is obtained. Pixel values in a first row after the multivaluing processing are "65" "61" "46" "34". Similarly, pixel values in a second row are "61"

"57" "50" "38". Pixel values in a third row are "50" "53" "42" "42". Pixel values in a fourth row are "42" "38" "42" "34". A range of values that the pixel can take is 100 of which "99" is a maximum value and "0" is a minimum value.

In this way, when the weighted-average filter 1007 is applied to the 4×4 pixels expressed as "0xA5A4", the result is "65, 61, 46, 34, 61, 57, 50, 38, 50, 53, 42, 42, 42, 38, 42, 34". Therefore, a table is created beforehand to define replacement of an image of 4×4 pixels expressed as "0xA5A4" with "65, 61, 46, 34, 61, 57, 50, 38, 50, 53, 42, 42, 42, 38, 42, 34". This increases the processing speed. For each of all 256 patterns of combinations of ON pixels and OFF pixels in 4×4 pixels, it is necessary to create a table defining combinations of pixel values after the multivaluing processing. The reason why the number of patterns is 256 is as follows. In general, when a semi-transparent pattern sent from an application to a printer driver is sectioned by 4×4 pixels, a pattern of ON pixels and OFF pixels in the 4×4 pixels is one of 256 predetermined patterns.

<Details of Screen Application in Step S904>

The processing in step S904 for applying a patterning screen to the scaled semi-transparent pattern 1005 expressed in values 0 to 100 will be described referring to FIG. 13.

When the printer driver 803 performs the multivaluing (step S902) and then scales (step S903) a transparent pattern having transparency of 30%, a scaled semi-transparent pattern like image 1302 is obtained (image 1302 is similar to image 1005 in FIG. 10). The printer driver 803 performs binarization by applying a patterning screen, such as 1301, to this scaled semi-transparent image. The patterning screen 1301 has a threshold for each pixel, as with an ordinary dithering matrix. A pixel equal to or greater than the threshold is determined to be black and a pixel less than the threshold is determined to be transparent (not white).

This patterning screen has a size of 16×16 pixels. The reason for this is as follows. A semi-transparent pattern received from the application 802 is always a pattern in which a group of 16 vertically arranged pixels by 16 horizontally arranged pixels is repeated, and it is desirable to achieve the same pattern as this pattern.

Now, how the patterning screen is designed will be described using the screen pattern 1301, a semi-transparent pattern 1304, and a semi-transparent pattern 1305.

The semi-transparent pattern 1304 is sent from the application 802 to the printer driver 803 when the transparency is set at 1%. Further, the semi-transparent pattern 1305 is sent when the transparency is set at 2%.

To obtain the same pattern as the semi-transparent pattern 1304 having transparency of 1%, a threshold 1 is set at a position of the screen pattern 1301, the position corresponding to an ON pixel of the semi-transparent pattern 1304. Next, to obtain the same pattern as the semi-transparent pattern 1305 having transparency of 2%, a threshold 2 is set at a position of the screen pattern 1301, the position corresponding to an ON pixel of the semi-transparent pattern 1305, and other than the position of the ON pixel of the semi-transparent pattern 1304 having transparency of 1%.

In this way, the ON pixel position of each of the semi-transparent patterns having transparency of 1% to 99% is checked, and a threshold array designed by checking an increase in the ON pixel positions is determined as the patterning screen. The printer driver 803 stores such a patterning screen beforehand.

Thus, this patterning screen is applied to the scaled semi-transparent pattern 1302, so that an image 1303 is obtained. More specifically, the density of a pixel having a density equal to or greater than the threshold is "1" (i.e., ON and black pixel), and a density of the pixel having a density less than the threshold is none (i.e., transparent pixel). As described above, the image 1303 includes ON pixels of completely black (neither white nor gray), and OFF pixels (transparent pixels). On the other hand, the image 1303 does not include OFF pixels of white and gray.

The positions of the ON pixels in the image 1303 are similar to the positions of the ON pixels in the semi-transparent pattern 1002 sent from the printer driver 803, as illustrated in FIGS. 10 and 11.

Figure 14:
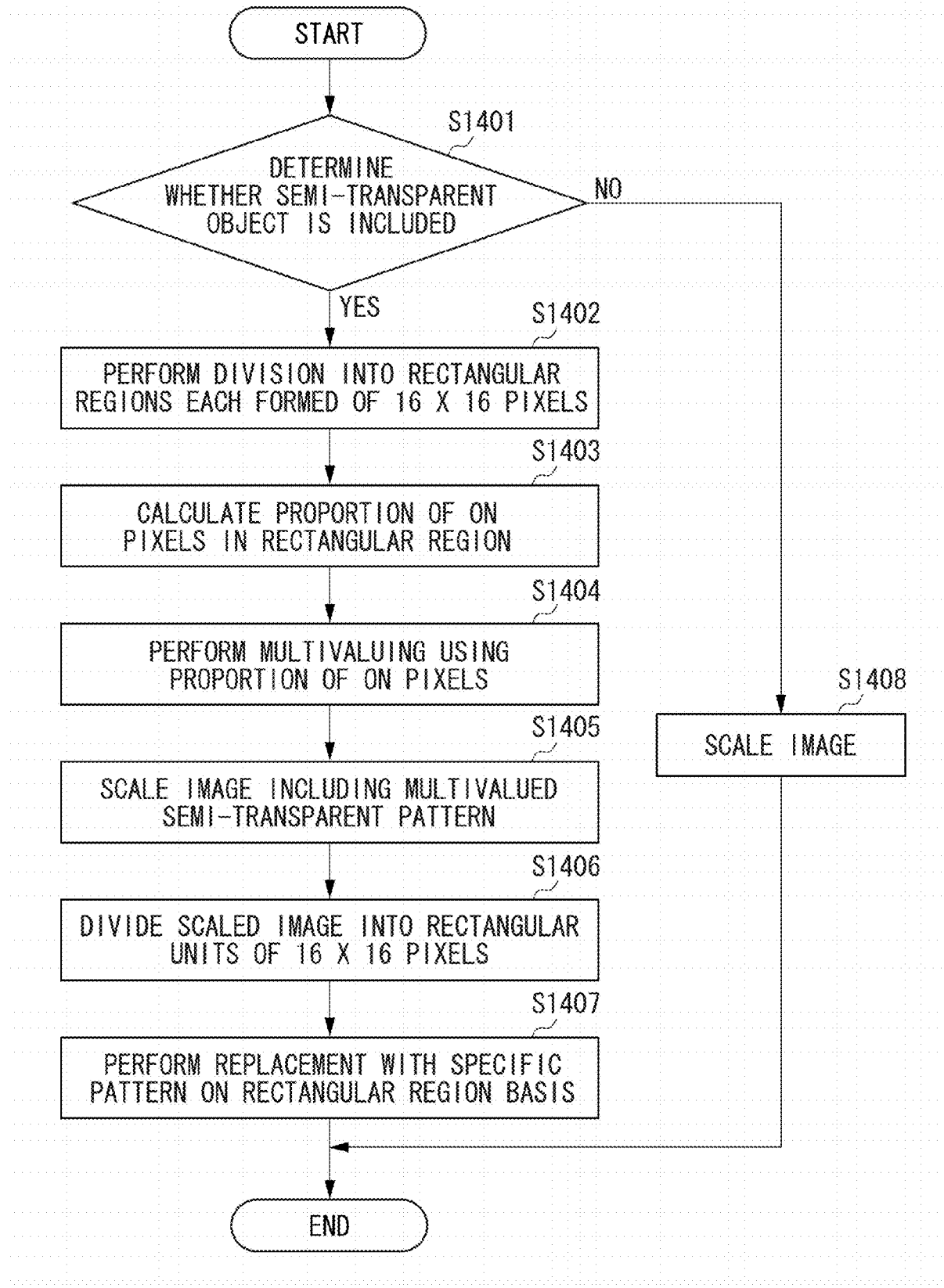
FIG. 14 is a flowchart illustrating processing according to a second embodiment of the present invention.

Next, a second embodiment of the present invention will be described. In the second embodiment, only parts that are different from the first embodiment will be described. Specifically, the part that is different from the first embodiment is the processing for multivaluing the semi-transparent pattern (such as in step S902 in the first embodiment) in the processing performed by the printer driver 803. Therefore, this part will be described with reference to a processing flow of FIG. 14, and FIG. 15.

In step S1401, the printer driver 803 determines whether document data received from the application 802 includes a semi-transparent object. The way of performing this determination has been specifically described in the first embodiment, and thus will not be described here. When the document data includes a semi-transparent object (YES in step S1401), the printer driver 803 performs processing in step S1402 and the subsequent steps. When the document data does not include a semi-transparent object (NO in step S1401), the processing proceeds to step S1408. In step S1408, the printer driver 803 scales an image of the document data according to a scaling factor.

In step S1402, the printer driver 803 divides a semi-transparent pattern image to be rendered by an AND rendering command, into rectangular regions each formed of 16×16 pixels. The reason for this division is that the semi-transparent pattern always has information indicating a pattern formed of 16 vertically arranged pixels by 16 horizontally arranged pixels, as described above.

In step S1403, the printer driver 803 calculates a ratio of ON pixels in the region of 16×16 pixels obtained by the division in step S1402. From this ratio of the ON pixels, transparency of the semi-transparent pattern can be found. For example, when there are 102 ON pixels among the 16×16 pixels, the transparency is 60%. An image 1501 illustrates this state (see FIG. 15).

In step S1404, the printer driver 803 multivalues this region, based on the ratio of the ON pixels in the region of 16×16 pixels, obtained in step S1403. This processing will also be described in detail below.

In step S1405, the printer driver 803 scales the image including the semi-transparent pattern multivalued in step S1404, according to a scaling factor. The scaling method is similar to the scaling method used in step S903 in the first embodiment and thus will not be described here.

In step S1406, the printer driver 803 divides the scaled semi-transparent pattern, scaled in step S1405, into units of 16×16 pixels. The reason for this division into 16×16 pixel units has been described above.

In step S1407, the printer driver 803 performs processing for replacement with a semi-transparent pattern having transparency of 1% to 99%, for each of the regions resulting from the division in step S1406. This processing for replacement with the semi-transparent pattern is performed in a manner similar to the patterning screen application performed in step S904 in the first embodiment. Therefore, this processing will not be described here.

<Details of Multivaluing Processing Using Ratio of ON Pixels in Step S1404>

Figure 15:
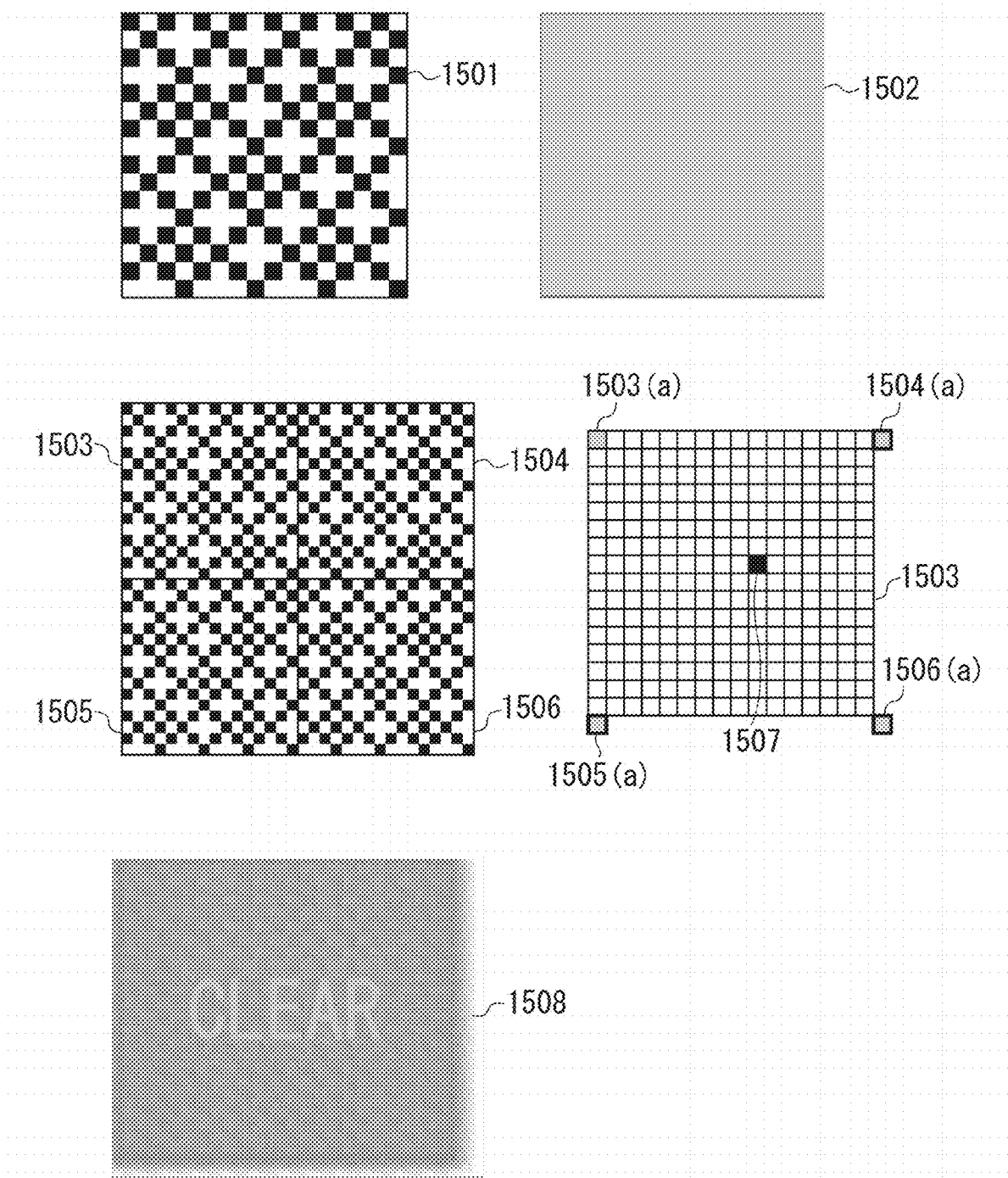
FIG. 15 is a diagram illustrating processing performed in step S1404 of FIG. 14.

Details of the multivaluing processing using the ratio of ON pixels to 16×16 pixels will be described with reference to FIG. 15.

When the ratio of ON pixels is 40% (when there are 102 ON pixels among 16×16 pixels), "(102/256)×100%=40" is a density in the multivaluing. An image 1502 indicates this state. However, this result is similar to a result of simply averaging the regions of 16×16 pixels. When the pattern 1101 in FIG. 11 is multivalued using this method, characters of a word such as "clear" forming a shape (formed by a particular arrangement of black pixels and white pixels) become blurred. Therefore, processing is performed to obtain a result similar to that of the multivaluing processing using the weighted average of the first embodiment.

More specifically, when a rectangle 1503 of 16×16 pixels is a target rectangle, pixel values of 256 pixels in this target rectangle 1503 are determined using values resulting from multivaluing the rectangle 1503 as well as rectangles 1504, 1505, and 1506 that are in units of 16×16 pixels. These values resulting from the multivaluing utilize the density in multivaluing of the region of 16×16 pixels. This density is obtained in the manner described above. For example, a pixel value 1507 in the target rectangle 1503 is determined through bilinear interpolation using a density 1503 ($a$) in the multivaluing of the rectangle 1503, as well as densities 1504 ($a$), 1505 ($a$), and 1506 ($a$).

When the above described processing is performed in the above example, the pattern 1101 in FIG. 11 results in image 1508 where the word "clear" is easily distinguished.

The present embodiment can also prevent considerable deterioration of the semi-transparent pattern image due to the scaling processing.

Figure 1:
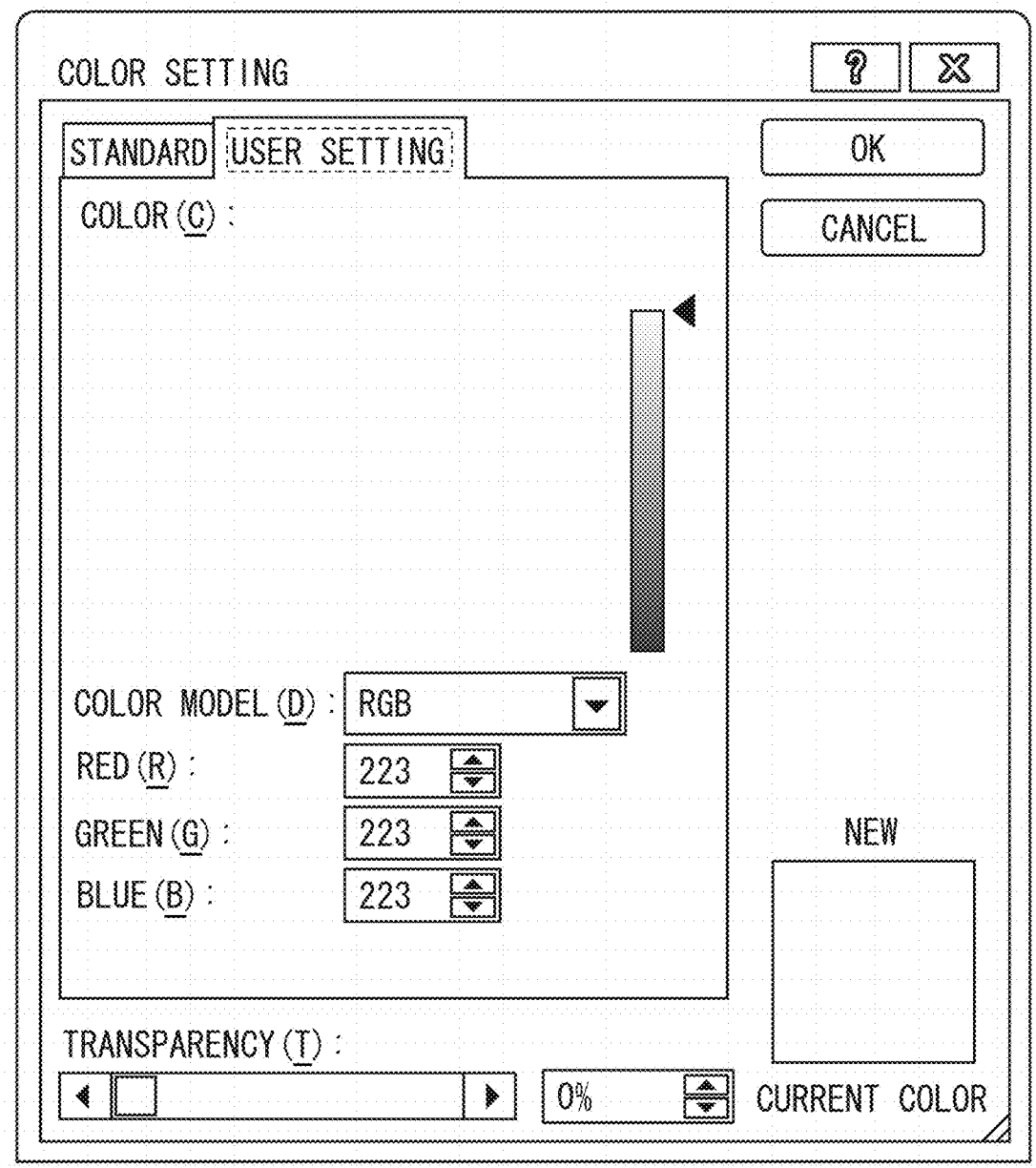
FIG. 1 is a diagram illustrating a user interface provided to set transparency.
Figure 2:
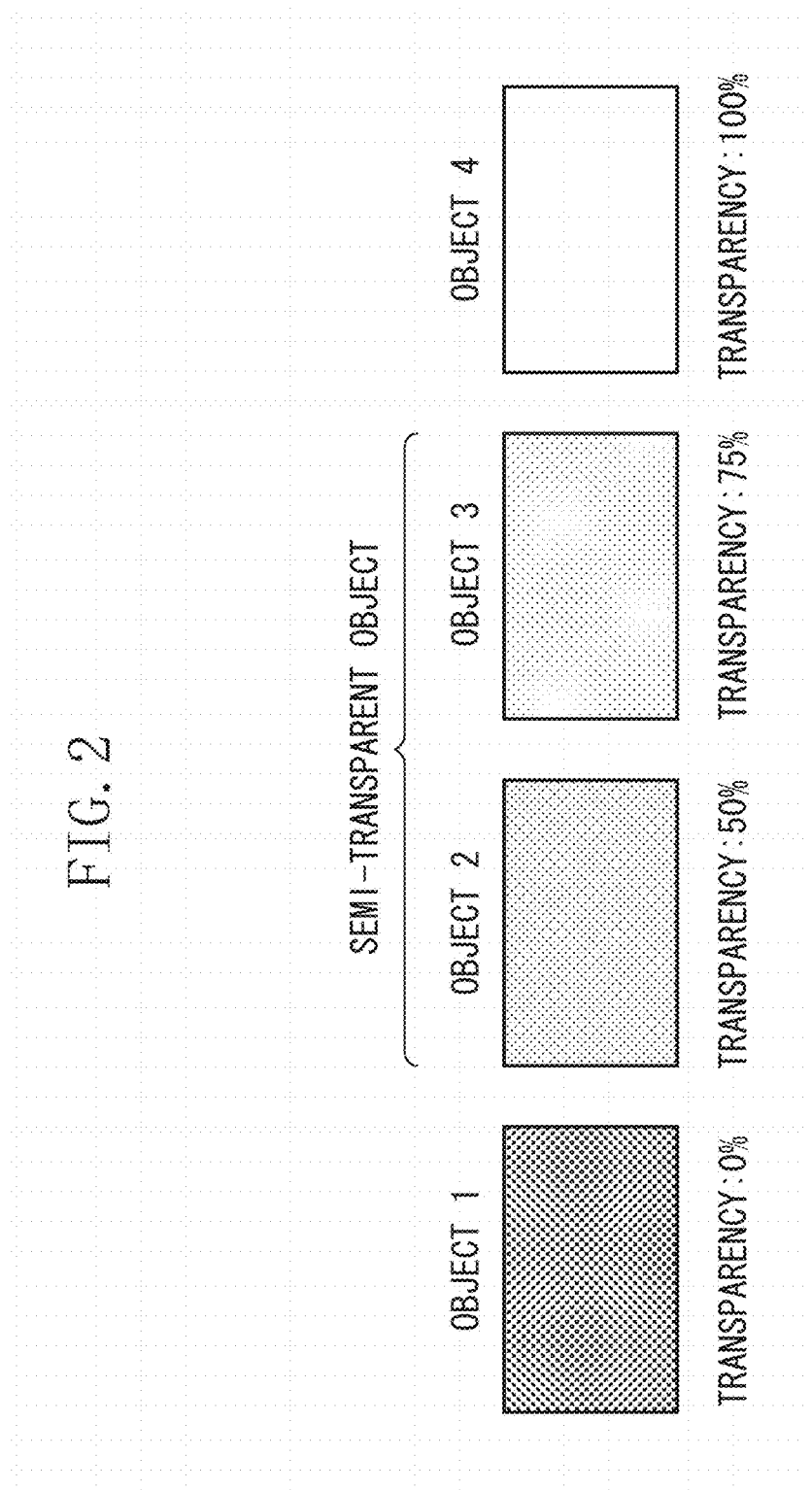
FIG. 2 is a diagram illustrating objects each having a set transparency.
Figure 3:
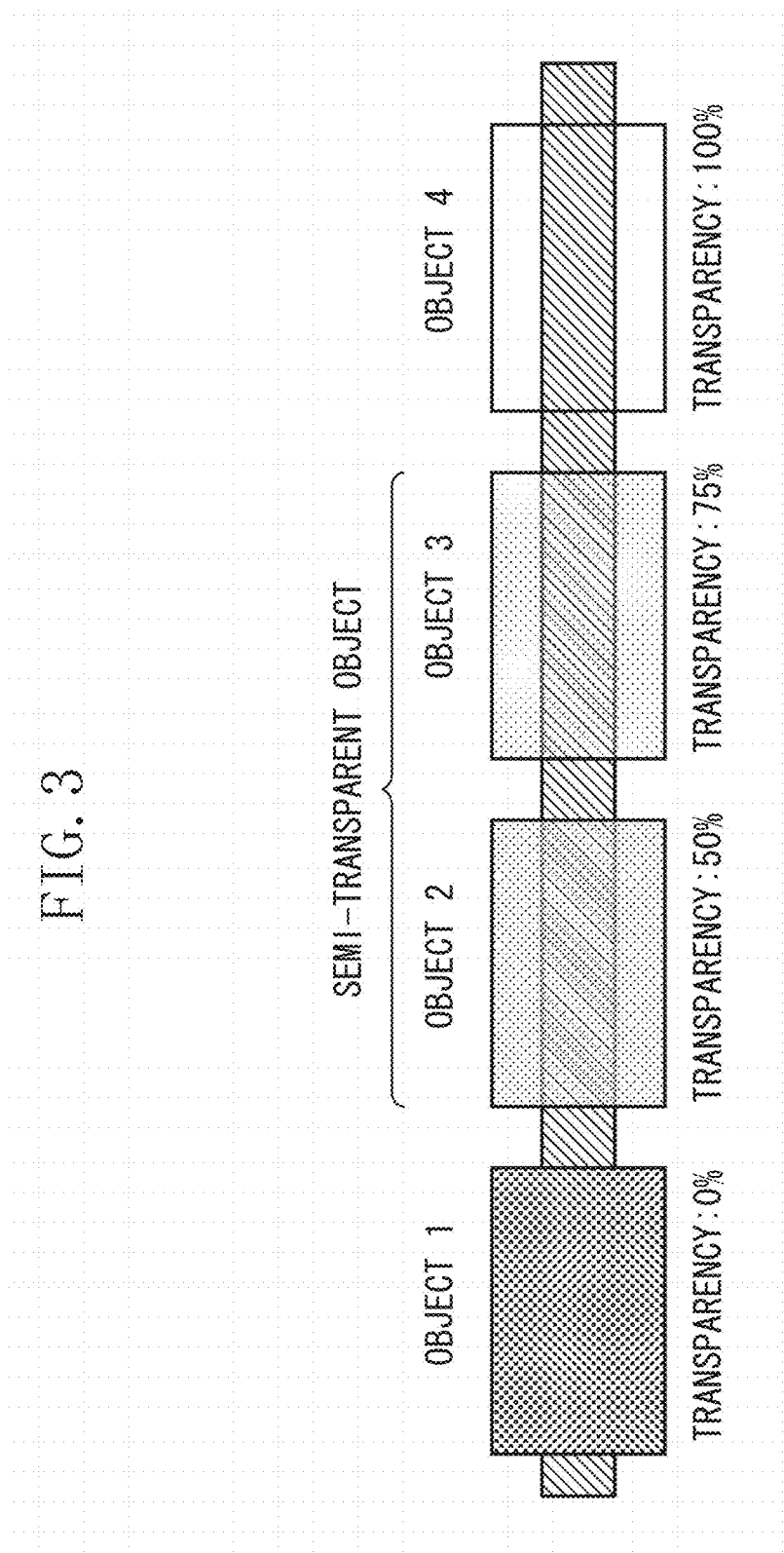
FIG. 3 is a diagram illustrating significance of a semi-transparent object.
Figure 4:
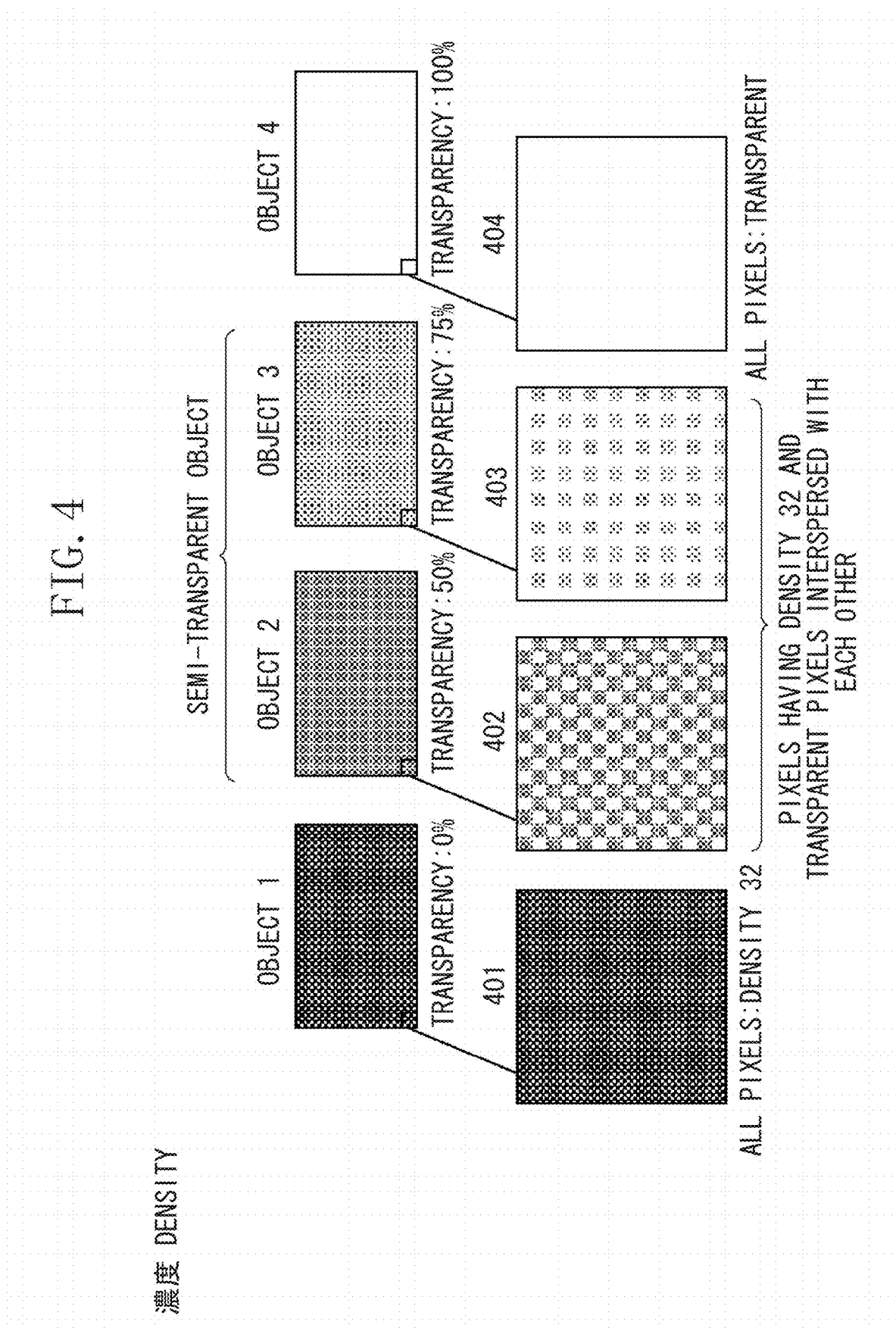
FIG. 4 is a diagram illustrating enlarged views of the objects.
Figure 5:
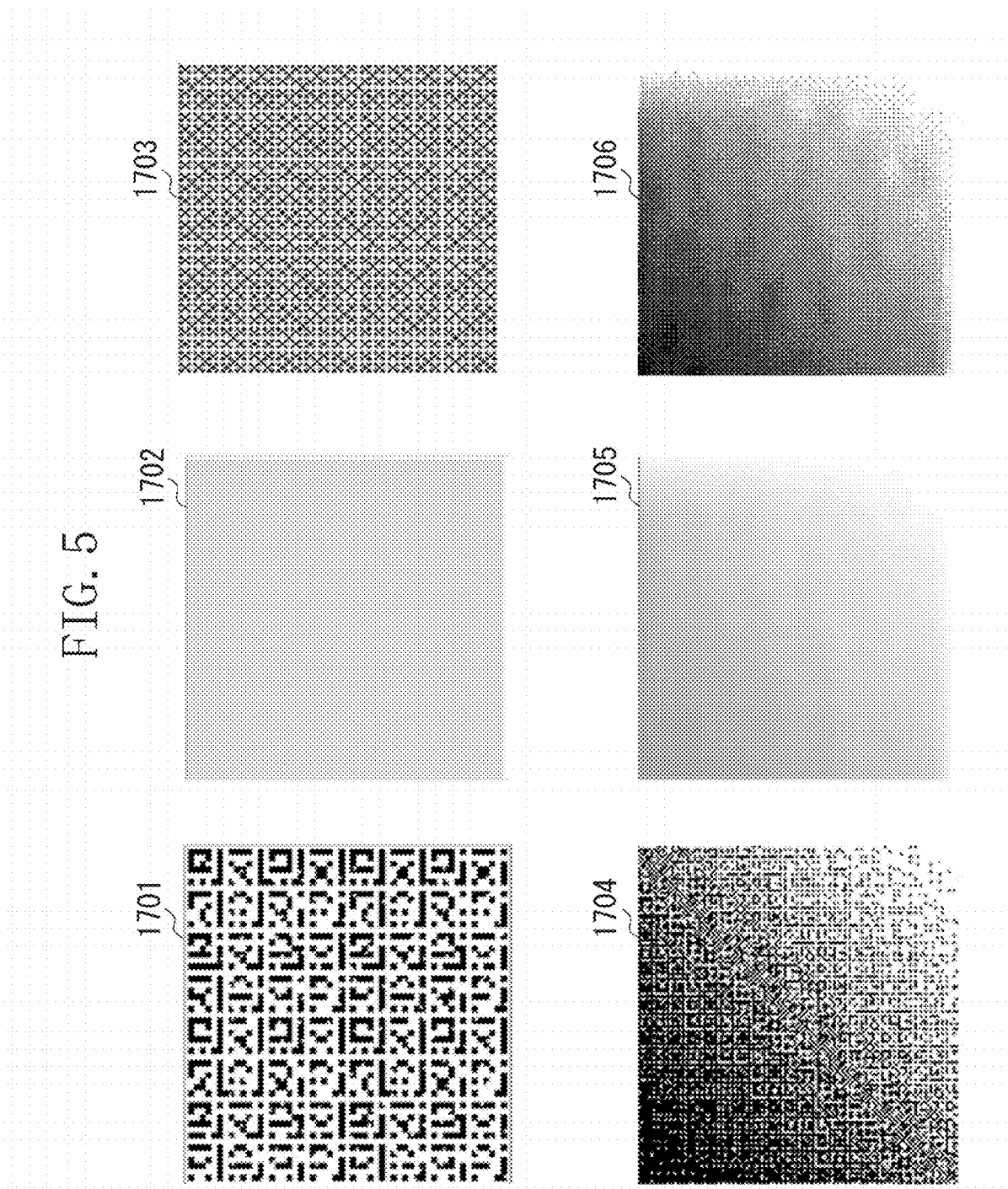
FIG. 5 is a diagram illustrating a third embodiment of the present invention.

Next, a third embodiment of the present invention will be described with reference to FIG. 5 and FIG. 16. In the first and second embodiments of the present invention, the processing in the printer driver 803 in the host computer 801 has been described in detail. In the third embodiment, the rendering object generation unit 806 in the printing apparatus 804 performs processing for obtaining effects similar to those of the first and second embodiments.

In the first and second embodiments, there has been described a processing method performed in a printer driver for preventing distortion of a semi-transparent object in the scaling processing. In the present embodiment, a processing of the printing apparatus 804 is described when the printer driver 803 did not perform the processing method for preventing distortion of a semi-transparent object and performed a conventional scaling processing on the semi-transparent object. In this case, the printing apparatus 804 receives a semi-transparent object/pattern 1701 in a distorted state. A semi-transparent object/pattern 1704 is another example of a semi-transparent object/pattern in a distorted state (see FIG. 5). The processing to be performed in the printing apparatus 804 in this case will be described. The semi-transparent pattern 1701 or 1704 is an enlarged view of a distorted semi-transparent pattern.

The rendering object generation unit 806 performs the processing shown in the flowchart of FIG. 16, on a command analyzed by the command analysis unit 805, and when an object is determined as a semi-transparent object.

In step S1601, the rendering object generation unit 806 in the printing apparatus 804 multivalues the semi-transparent pattern 1701 or 1704 on a rectangular region basis. Results of this multivaluing are illustrated by the pattern 1702 or 1705. For this multivaluing, either the multivaluing processing in step S902 described in the first embodiment, or the multivaluing processing using the ratio of ON pixels in step S1404 described in the second embodiment, may be used.

In step S1602, the rendering object generation unit 806 replaces the multivalued semi-transparent pattern with a specific pattern having transparency of 1% to 99%. Results of the replacement are illustrated by patterns 1703 or 1706. This method also uses the screen application performed in step S904 described in the first exemplary embodiment.

Accordingly, even when the printing apparatus 804 receives an already distorted semi-transparent pattern from the printer driver 803, considerable image deterioration due to pattern distortion can be prevented.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention. The embodiments can also be realized by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

According to the embodiments of the present invention, image deterioration due to scaling of a semi-transparent pattern can be resolved.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2014-004576 filed Jan. 14, 2014, which is hereby incorporated by reference herein in its entirety.

What is claimed is:

1. An information processing apparatus comprising:
a receiving unit configured to receive an XOR-AND-XOR rendering command set including an image and a pattern indicating positions of non-transparent pixels of a semi-transparent object;
a multivaluing processing unit configured to perform multivaluing processing on the pattern included in the XOR-AND-XOR rendering command set;
a scaling processing unit configured to perform scaling processing on the image included in the XOR-AND-XOR rendering command set and the multivalued pattern;

an applying unit configured to apply a screen to the scaled pattern to obtain another pattern indicating positions of non-transparent pixels of a scaled version of the semi-transparent object; and a generating unit configured to generate another XOR-AND-XOR rendering command set including the scaled image and the obtained another pattern.

2. The information processing apparatus according to claim 1, further comprising a transmission unit configured to transmit the generated another XOR-AND-XOR rendering command set to an image forming apparatus, wherein the image forming apparatus performs rendering of the transmitted another XOR-AND-XOR rendering command set to generate a bitmap image and applies another screen different from the screen applied by the applying unit.

3. The information processing apparatus according to claim 1, wherein the multivaluing processing includes an application of a weighted-average filter to the pattern.

4. The information processing apparatus according to claim 1, wherein the screen is a patterning screen having a plurality of thresholds for reproducing the pattern included in the XOR-AND-XOR rendering command set.

5. The information processing apparatus according to claim 3, wherein in the pattern, the non-transparent pixel is expressed as 1 and a transparent pixel different from the non-transparent pixel is expressed as 0, and wherein the multivaluing processing unit applies a weighted-average filter while multivaluing 0 and 1 of the pattern.

6. The information processing apparatus according to claim 5, wherein the multivaluing processing unit obtains the multivalued pattern by calculating a weighted average of values of respective pixels in a matrix of a predetermined size including a target pixel in the pattern.

7. The information processing apparatus according to claim 1, wherein a screen used by the applying unit is designed to regenerate a pattern.

8. The information processing apparatus according to claim 7, wherein the screen used by the applying unit is designed by determining positions of black pixels, when transmittance of a semi-transparent object whose non-transparent pixels are black is increased in steps of 1%.

9. The information processing apparatus according to claim 1, wherein the semi-transparent object expresses semi-transparency as a combination of non-transparent pixels and a-transparent pixels.

10. The information processing apparatus according to claim 1, wherein in a case where the scaling processing is reduction processing, the reduction processing is thinning reduction processing.

11. An information processing method comprising:
receiving an XOR-AND-XOR rendering command set including an image and a pattern indicating positions of non-transparent pixels of a semi-transparent object;
performing multivaluing processing on the pattern included in the XOR-AND-XOR rendering command set;
performing scaling processing on the image included in the XOR-AND-XOR rendering command set and the multivalued pattern;
applying a screen to the scaled pattern to obtain another pattern indicating positions of non-transparent pixels of a scaled version of the semi-transparent object; and
generating another XOR-AND-XOR rendering command set including the scaled image and the obtained another pattern.

12. A non-transitory computer-readable storage medium storing a program to be executed for performing an information processing method, the method comprising:
receiving an XOR-AND-XOR rendering command set including an image and a pattern indicating positions of non-transparent pixels of a semi-transparent object;
performing multivaluing processing on the pattern included in the XOR-AND-XOR rendering command set;
performing scaling processing on the image included in the XOR-AND-XOR rendering command set and the multivalued pattern;
applying a screen to the scaled pattern to obtain another pattern indicating positions of non-transparent pixels of a scaled version of the semi-transparent object; and
generating another XOR-AND-XOR rendering command set including the scaled image and the obtained another pattern.

* * * * *